M. R. Fenton,
Curtain Fixture.
Nº 66,010. Patented June 25, 1867.
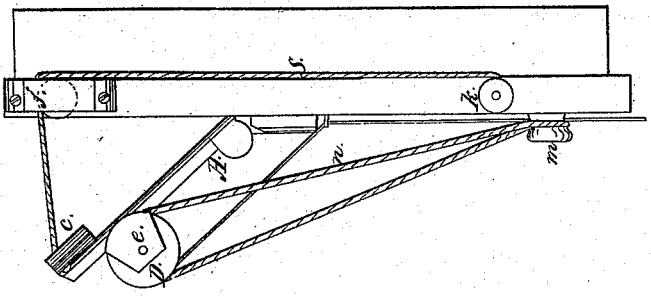
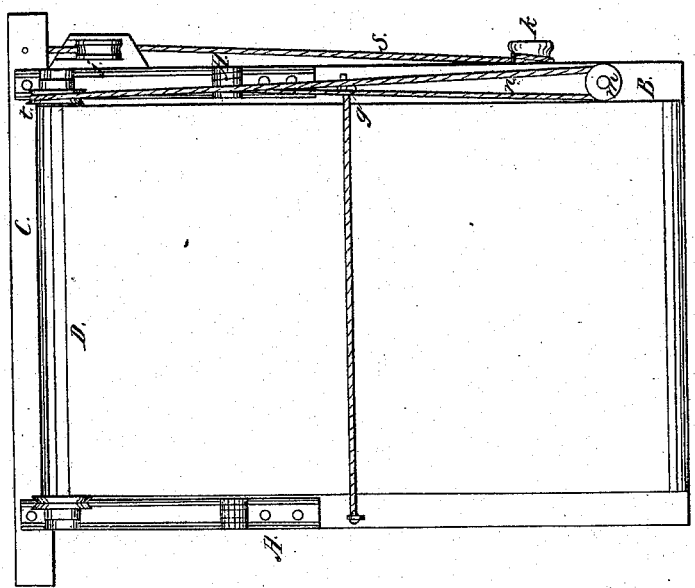
Witnesses:
F. Lehmann
Robt Green
Inventor:
M R Fenton
per
J H Alexander & Co
Attys

United States Patent Office.

M. R. FENTON, OF WASHINGTON, DISTRICT OF COLUMBIA.

Letters Patent No. 66,010, dated June 25, 1867.

IMPROVED CURTAIN FIXTURE.

*The Schedule referred to in these Letters Patent and making part of the same.*

TO ALL WHOM IT MAY CONCERN:

Be it known that I, M. R. FENTON, of the city of Washington, and District of Columbia, have invented certain new and useful improvements in Curtain Fixtures; and I hereby declare that the following is a true, full, and exact description of the same, reference being had to the accompanying drawings, and to the letters of reference marked thereon. In the annexed drawings, which make a part of this specification—

Figure 1 represents a front view of a window-frame with my fixtures attached.

Figure 2 is a side elevation of the same.

The letter A designates two hinges, each of which is secured by screws precisely at the same distance from the top of the frame B. The hinges A are constructed with a long and a short wing, the short wing being fastened to the frame as above described, and the long or adjustable wing is strongly secured to the bar C on its outer side. D represents a roller to which the curtain is fastened, and on which the curtain is rolled up. The said roller is pivoted in the arms $c$ $c$, which are fastened at right angles with the long arm of hinges A. Below the lower end of the short wing of hinge A is inserted an eye, $g$, through which a rubber cord is passed, the opposite end of said cord being looped and passing over a hook corresponding in position with eye $g$. The object of this cord is to keep the curtain close to the window-frame when desired. In order to operate the upper end of the curtain the cord $s$ is provided, one end of which is fastened to bar C, and then passes over the pulley $j$, and has its pendent end wrapped around the knob $k$. On one end of roller D is the fixed pulley $t$, with a looped elastic cord, $n$, passing around it, the lower end of the loop embracing the knob $m$.

The advantage of my invention consists in the mode of operating the curtain. By the action of the elastic cord $n$ the roller D and bar C will be drawn down as far as eye $g$, thus leaving an open space above for the admission of light and air. To prevent the sunshine from entering the room, the roller D and bar C can be raised by the action of cord $s$ until the long wing of hinges A is thrown in a horizontal position. It will be seen from the above description that the bar C can be adjusted at any intermediate angle between forty-five degrees and a vertical position.

Having thus described my invention, what I claim, and desire to secure by Letters Patent, is—

1. The hinges A A, in combination with bar C and roller D, substantially as and for the purpose specified.

2. Hinges A A, pulley $j$, cords $s$ and $n$, and roller D, combined and operating in the manner and for the purpose substantially as herein described.

In testimony whereof I affix my signature in presence of two witnesses.

M. R. FENTON.

Witnesses:
T. H. ALEXANDER,
CHARLES ALEXANDER.